US010687384B2

(12) United States Patent
Cohn et al.

(10) Patent No.: US 10,687,384 B2
(45) Date of Patent: Jun. 16, 2020

(54) ENHANCED WI-FI DISCONNECTION WITH COLLOCATED WIRELESS TECHNOLOGY

(71) Applicant: Intel Corporation, Santa Clara, CA (US)

(72) Inventors: Daniel Cohn, Raanana (IL); Nir Balaban, Tel Aviv (IL); Oz Shalev, Hogla (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/232,407

(22) Filed: Dec. 26, 2018

(65) Prior Publication Data

US 2019/0132901 A1 May 2, 2019

(51) Int. Cl.
| | |
|---|---|
| *H04M 1/00* | (2006.01) |
| *H04W 76/34* | (2018.01) |
| *H04W 24/08* | (2009.01) |
| *H04W 88/06* | (2009.01) |
| *H04W 48/10* | (2009.01) |
| *H04W 84/12* | (2009.01) |

(52) U.S. Cl.
CPC .......... *H04W 76/34* (2018.02); *H04W 24/08* (2013.01); *H04W 48/10* (2013.01); *H04W 84/12* (2013.01); *H04W 88/06* (2013.01)

(58) Field of Classification Search
CPC ..... H04W 48/12; H04W 48/16; H04W 48/18; H04W 48/20; H04W 88/06

USPC .............................................. 455/552.1, 434
See application file for complete search history.

(56) References Cited

U.S. PATENT DOCUMENTS

| | | | |
|---|---|---|---|
| 7,385,953 B2* | 6/2008 | Ho .......................... | H04W 48/12 370/330 |
| 2015/0156709 A1* | 6/2015 | Shukla ................... | H04W 48/16 370/338 |
| 2019/0098565 A1* | 3/2019 | Cherian ................. | H04W 48/16 |
| 2019/0246351 A1* | 8/2019 | Yang ................. | H04W 52/0216 |

* cited by examiner

*Primary Examiner* — Temica M Beamer
(74) *Attorney, Agent, or Firm* — Eversheds Sutherland (US) LLP

(57) ABSTRACT

This disclosure describes systems, methods, and devices related to disconnecting Wi-Fi radios due to operation of collocated wireless technology on a same device. A device may identify a first beacon received from an access point (AP), the first beacon indicating a beacon interval and received using a Wi-Fi radio. The device may determine an expected time to receive a second beacon. The device may identify a first signal received from a non-Wi-Fi radio collocated with the Wi-Fi radio. The device may determine, based on the first signal, an indication of a transmission or a reception of a second signal by the second radio during a time which overlaps the beacon interval. The device may determine a failure to identify a second beacon during the beacon interval. The device may determine a counter and may determine, based on the counter, a connection status of the first radio with the AP.

17 Claims, 5 Drawing Sheets

ENHANCED WI-FI DISCONNECTION WITH COLLOCATED WIRELESS TECHNOLOGY

TECHNICAL FIELD

This disclosure generally relates to systems, methods, and devices for wireless communications and, more particularly, to enhanced Wi-Fi disconnection.

BACKGROUND

Wireless devices are becoming widely prevalent and are increasingly using multiple wireless technologies. The operation of one wireless technology on a wireless device may impact the operation of another wireless technology on the same wireless device.

DETAILED DESCRIPTION

Figure 1:
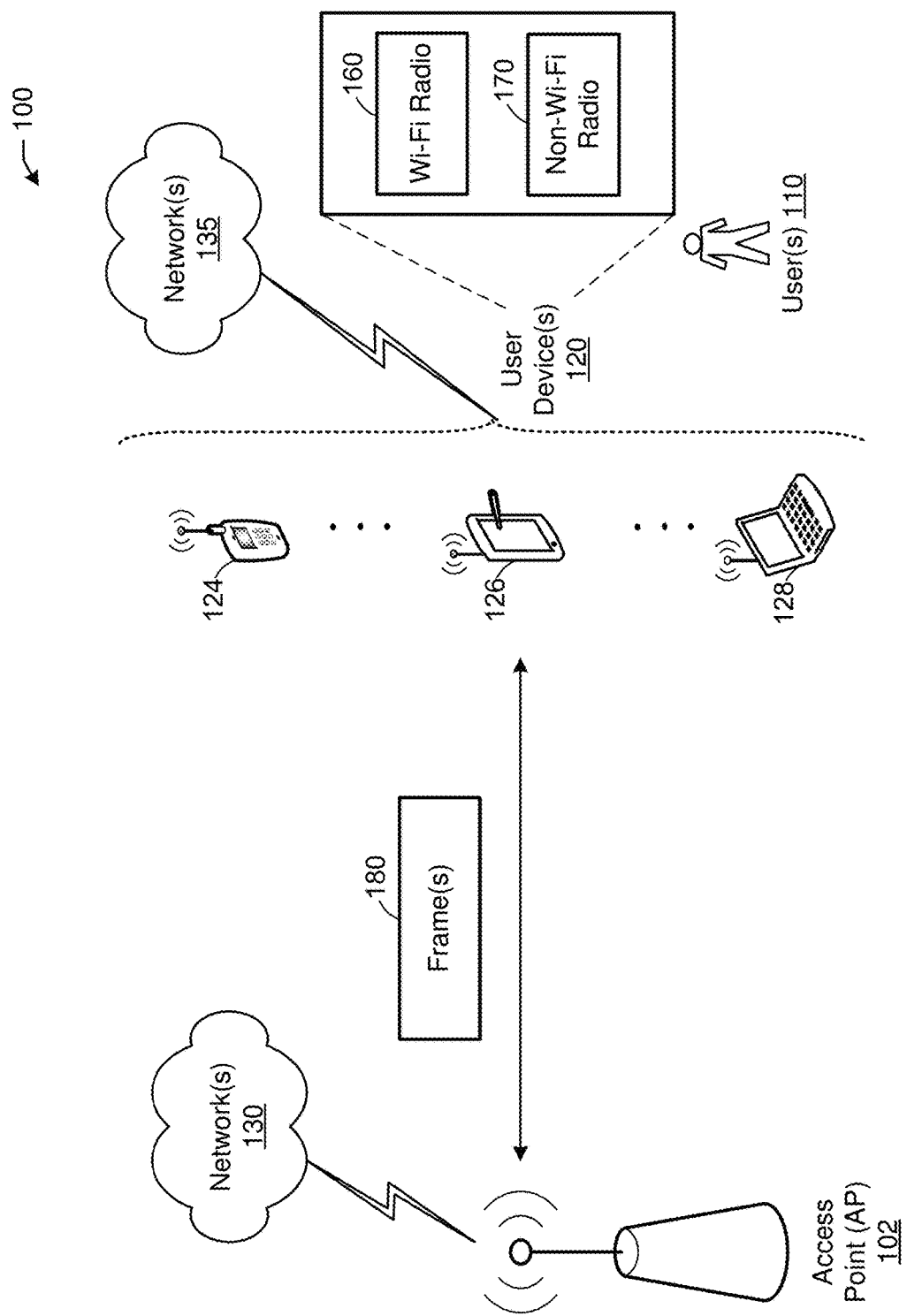
FIG. 1 depicts a diagram illustrating an example network, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In Wi-Fi wireless communications, devices may assess network conditions of Wi-Fi networks to which the devices are connected. Station devices (STAs) may connect to Wi-Fi networks hosted by access points (APs). When a STA is connected to a wireless network hosted by an AP and determines that the wireless network conditions are poor (e.g., low signal strength, high interference, low signal-to-noise ratio, slow transmission rate, and other conditions), the STA may disconnect from the AP and search for another AP to which to connect.

One way that STAs assess Wi-Fi network conditions and determine whether to disconnect from an AP is to track the receipt of beacons from the AP to which a STA is connected. Wi-Fi beacons may be management frames which indicate network information, and STAs connected to an AP may receive beacons based on a beacon interval (e.g., an interval between the transmission of respective beacons). APs may send beacons to any STAs in a basic service set (BSS), which may include STAs operating in a wireless network hosted by the AP. Beacons may include a timestamp to allow STAs to synchronize their clocks with the AP. Beacons also indicate the presence of an AP. When a STA receives a beacon from a nearby AP, the STA may determine information about a network hosted by the AP. If a STA receives beacons from multiple APs, the STA may determine which network to join based on conditions such as signal strength.

Because beacons may indicate a beacon interval (e.g., a time until a next beacon), a STA which receives a beacon may anticipate the arrival time of a next beacon from an AP based on the beacon interval. Sometimes a STA may not receive a beacon at the anticipated time based on the beacon interval, but the STA may not disconnect immediately if the STA determines that no beacon was received after a beacon interval. Beacons may be missed for a number of reasons which may not justify an STA disconnecting from an AP. For example, some temporary interference or decreased communication link quality may prevent a STA from receiving a beacon. The STA may remain connected to an AP until after a number of consecutive beacons are missed (e.g., nine consecutive beacons or another number). After a number of consecutively missed beacons (e.g., no beacons have been received after a number of consecutive beacon intervals), the STA may disconnect from the AP and search for a better connection. The premise for disconnection may be that a number of consecutively missed beacons may indicate a poor connection with the AP which justifies looking for a better AP connection. When a STA disconnects and "roams" for another available AP, the disconnection may be unnecessary and may result in wasted time and device resources to establish another connection. The inefficient use of device resources may reduce user experience. Even if a STA successfully finds another AP connection, the connection may be weaker than the previous connection, resulting in downgraded performance and network capacity.

Not all missed beacons are caused by poor network conditions, however. For example, a collocated wireless technology (e.g., a radio supporting a different, non-Wi-Fi wireless technology on the same device) such as Bluetooth, LTE, and other wireless technologies may be active on a device. If a STA has a Wi-Fi radio and one or more other radios for technologies such as Bluetooth and LTE, transmissions by the other radios may interfere with reception of a Wi-Fi beacon even in ideal Wi-Fi network connections. Thus, a missed beacon may not indicate poor Wi-Fi connection quality, but rather may be caused by activity of other wireless technology radios (e.g., collocated radios) on a same device. Radios of different wireless technologies on a same device may not communicate their activity with other collocated radios, however, and such communication Therefore, devices with collocated radios of different wireless technologies may avoid unnecessary disconnections, roaming, and reconnections by using an enhanced mechanism for Wi-Fi disconnections.

Devices with Wi-Fi radios may rely on a medium access control (MAC) sub-layer of a data link layer of an open systems interconnection model to determine if detected energy of a device is from a beacon or some other kind of energy (e.g., interference). Wi-Fi disconnection/roaming logic on a device may receive indications for the MAC sub-layer when a beacon is received. A management entity of the device may provide indications of when a next beacon is expected based on a beacon interval and which beacons may be ignored. A power manager entity of a device may determine whether a device is to be in a low-power (e.g., sleep mode) so that the device may be awake to receive a beacon. Based on this information, the disconnection/roaming logic of a device may determine when an expected beacon was not received (e.g., a "contaminated" beacon), when a consecutive number of missed/contaminated beacons exceeds a threshold number of missed/contaminated beacons, and when to send a disconnection/roaming command to a MAC, which may facilitate disconnection of a Wi-Fi radio from an AP (e.g., leaving a BSS or other network associated with the AP).

Example embodiments of the present disclosure relate to systems, methods, and devices for disconnecting Wi-Fi radios due to operation of collocated wireless technology on a same device.

In one or more embodiments, the disconnection/roaming logic of a device may receive traffic information from a collocated radio of another (e.g., non-Wi-Fi) wireless technology. The collocated non-Wi-Fi radio may indicate to a Wi-Fi radio that the non-Wi-Fi radio is active (e.g., sending or receiving traffic). The Wi-Fi radio may determine that a missed beacon may be due to a "contamination" (e.g., interference) caused by the non-Wi-Fi radio's activity. The disconnection/roaming logic associated with the Wi-Fi radio may determine whether to disconnect from an AP based on the indication that the non-Wi-Fi radio is active. For example, the threshold amount of missed/contaminated beacons used to determine whether to disconnect from an AP may be adjusted based on the indicated activity of the non-Wi-Fi radio. In particular, the disconnection/roaming logic for the Wi-Fi radio may ignore a missed/contaminated beacon if the non-Wi-Fi radio was active when the beacon was expected, or may increase the threshold number of beacons to be missed/contaminated before disconnecting from an AP (e.g., if nine missed/contaminated beacons results in disconnection without non-Wi-Fi radio activity, the number of beacons which may cause disconnection may increase to ten or more beacons).

In one or more embodiments, the signaling from a collocated non-Wi-Fi radio may include real-time in-chip signaling from the non-Wi-Fi radio indicating when the non-Wi-Fi radio is transmitting or receiving. The non-Wi-Fi radio may indicate when it has been active, and may indicate other information such as transmission/reception power, channel frequencies used, signal strength, and other relevant information that the Wi-Fi radio may use to determine whether a missed/contaminated beacon was caused by non-Wi-Fi radio activity.

In one or more embodiments, the signaling from a collocated non-Wi-Fi radio may include non-real-time signaling from the non-Wi-Fi radio. For example, the non-Wi-Fi radio may indicate to the Wi-Fi radio periodically its traffic patterns (e.g., when the non-Wi-Fi radio is transmitting/receiving). The Wi-Fi radio may determine when missed/contaminated beacons may be caused by interference from the activity of the non-Wi-Fi radio based on the indications of when the non-Wi-Fi radio is expected to be active. If the Wi-Fi radio and collocated non-Wi-Fi radio use different chips (e.g., processors or other hardware), an interface may be established between the Wi-Fi chip and the non-Wi-Fi chip to allow the collocated radios to indicate to each other when they are active or expected to be active. The Wi-Fi radio and its logic may be implemented on a same chip as non-Wi-Fi radios and their respective logic.

In one or more embodiments, activity indications provided by one or more non-Wi-Fi radios may result in an improvement of Wi-Fi coverage. In low-signal strength conditions, a Wi-Fi radio may expect to miss some beacons due to a poor connection. When a non-Wi-Fi radio is active on a same device, the non-Wi-Fi activity may increase the rate of missed/contaminated Wi-Fi beacons. Wi-Fi disconnection/roaming logic may determine, when a beacon is missed/contaminated, whether the number of consecutive missed beacons or beacons missed/contaminated over a given time has exceeded a threshold. When the non-Wi-Fi radio is active or is expected to be active based on periodic indicated activity, the threshold for missed beacons may increase to allow for more beacons to be missed/contaminated due to the increased likelihood of beacon misses caused by non-Wi-Fi radio activity.

In one or more embodiments, the collocated non-Wi-Fi logic may indicate traffic characteristics to the Wi-Fi logic, including transmission or reception direction, transmission power, signal strength, frequency, antennas used, and other information. The Wi-Fi logic may use the traffic characteristics to determine whether missed beacons may be caused by non-Wi-Fi activity. For example, the Wi-Fi logic may determine based on the traffic characteristics that a non-Wi-Fi signal sent or received by the device is strong and/or that the non-Wi-Fi radio may be communicating with a device nearby. Using the traffic characteristics, the Wi-Fi logic may determine that non-Wi-Fi communication characteristics are met or that any one or more of the traffic characteristics exceeds or fails to exceed a respective threshold (e.g., the strength of a non-Wi-Fi transmission at the time of a missed beacon exceeds a threshold strength). Considering the isolation of Wi-Fi antennas in addition to the traffic characteristics of the non-Wi-Fi radio, the Wi-Fi disconnection/roaming logic may determine whether a missed beacon is contaminated by the non-Wi-Fi activity of the same device.

In one or more embodiments, when a non-real-time interface between Wi-Fi and non-Wi-Fi cores/logic is used to indicate respective traffic, the collocated non-Wi-Fi logic may report traffic patterns to the Wi-Fi logic (and vice versa). For example, the non-Wi-Fi logic may report a transmission or reception period, a transmission or reception duration, transmission power, a frequency range, which non-Wi-Fi antennas may be used, and other relevant information. The Wi-Fi disconnection/roaming logic may use this traffic information to determine traffic patterns of the non-Wi-Fi radio (e.g., when the non-Wi-Fi radio is expected to be active). The Wi-Fi logic may not know for sure whether the non-Wi-Fi radio was active at a particular time, but may determine that the non-Wi-Fi radio was likely active at a particular time. When a non-Wi-Fi radio is indicated as or expected to be active when a Wi-Fi beacon is missed, or when the non-Wi-Fi traffic characteristics satisfy certain thresholds or criteria, the Wi-Fi logic may tag a missed beacon as contaminated.

In one or more embodiments, using indications of non-Wi-Fi activity/traffic, the Wi-Fi logic may modify disconnection/roaming logic. For example, the Wi-Fi logic may consider any beacon identified as contaminated as received, or may modify the weight of the missed beacon. For example, a missed beacon may be weighted based on the likelihood that the missed beacon was caused by collocated non-Wi-Fi activity. When collocated non-Wi-Fi activity is indicated or anticipated when a contaminated beacon is received (e.g., a beacon is missed), the Wi-Fi logic may assign a weight to the contaminated beacon that indicates a higher likelihood that the contaminated beacon was caused by non-Wi-Fi activity on the device. If the weight of the contaminated beacon exceeds a threshold (e.g., is sufficiently likely to be caused by non-Wi-Fi activity), the Wi-Fi logic may consider the contaminated beacon as correctly received and may adjust a counter indicating a number of consecutively missed/contaminated beacons. The Wi-Fi logic may adjust the threshold for consecutively missed beacons to allow for more missed beacons when non-Wi-Fi activity has occurred or was expected. When the non-Wi-Fi activity meets a condition (e.g., a duty cycle of the non-Wi-Fi communication is higher than a threshold), the Wi-Fi logic may consider a contaminated beacon as received correctly or may adjust the threshold for missed beacons. If the counter exceeds a threshold, a Wi-Fi connection with an AP may be disconnected.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment, according to some example embodiments of the present disclosure. Wireless network 100 may include one or more user device(s) 120 and one or more access point(s) (AP) 102, which may communicate in accordance with IEEE 802.11 communication standards, such as, the IEEE 802.11ax specification. The user device(s) 120 may be mobile devices that are non-stationary and do not have fixed locations.

Figure 4:
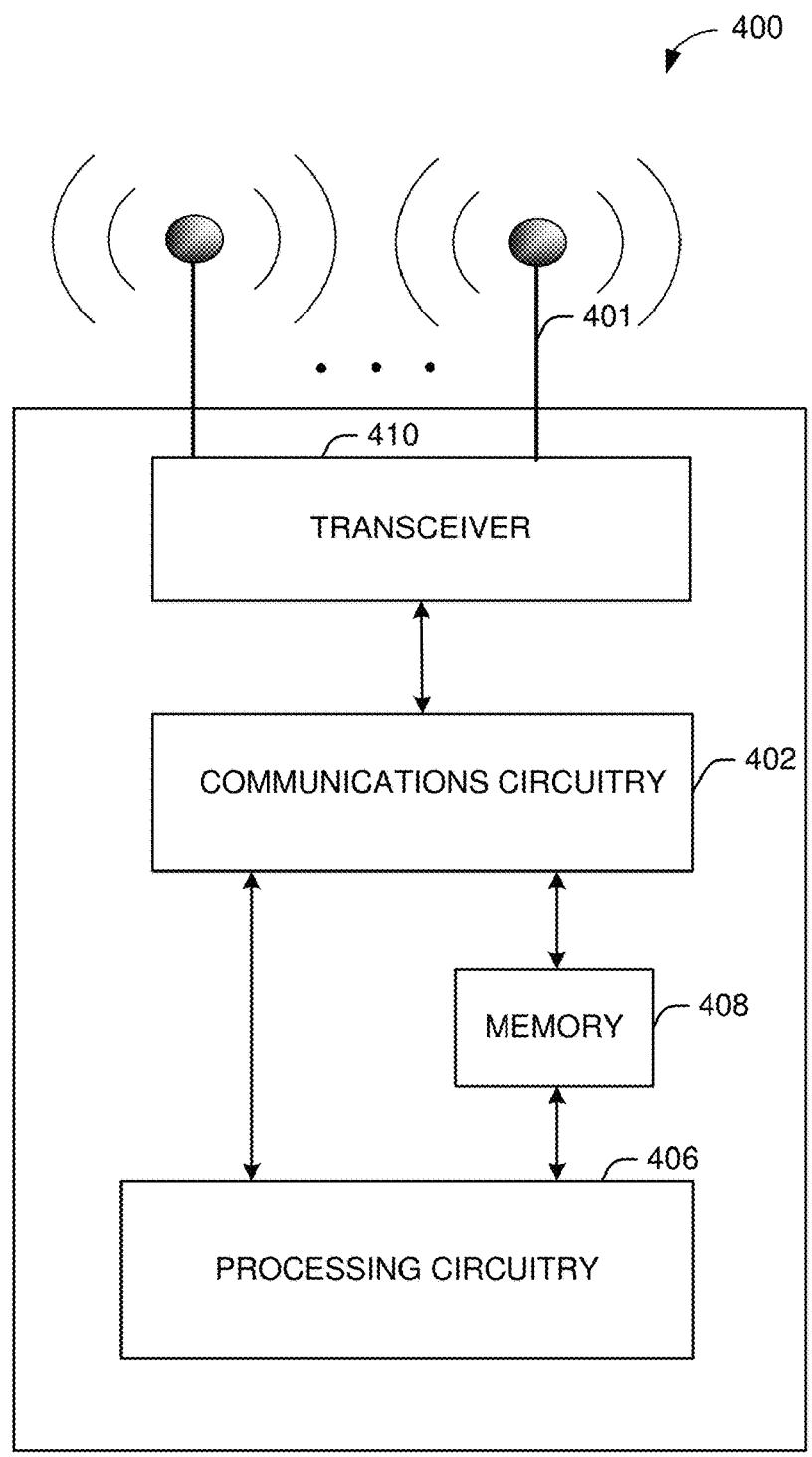
FIG. 4 depicts a functional diagram of an example communication station that may be suitable for use as a user device, in accordance with one or more example embodiments of the present disclosure.
Figure 5:
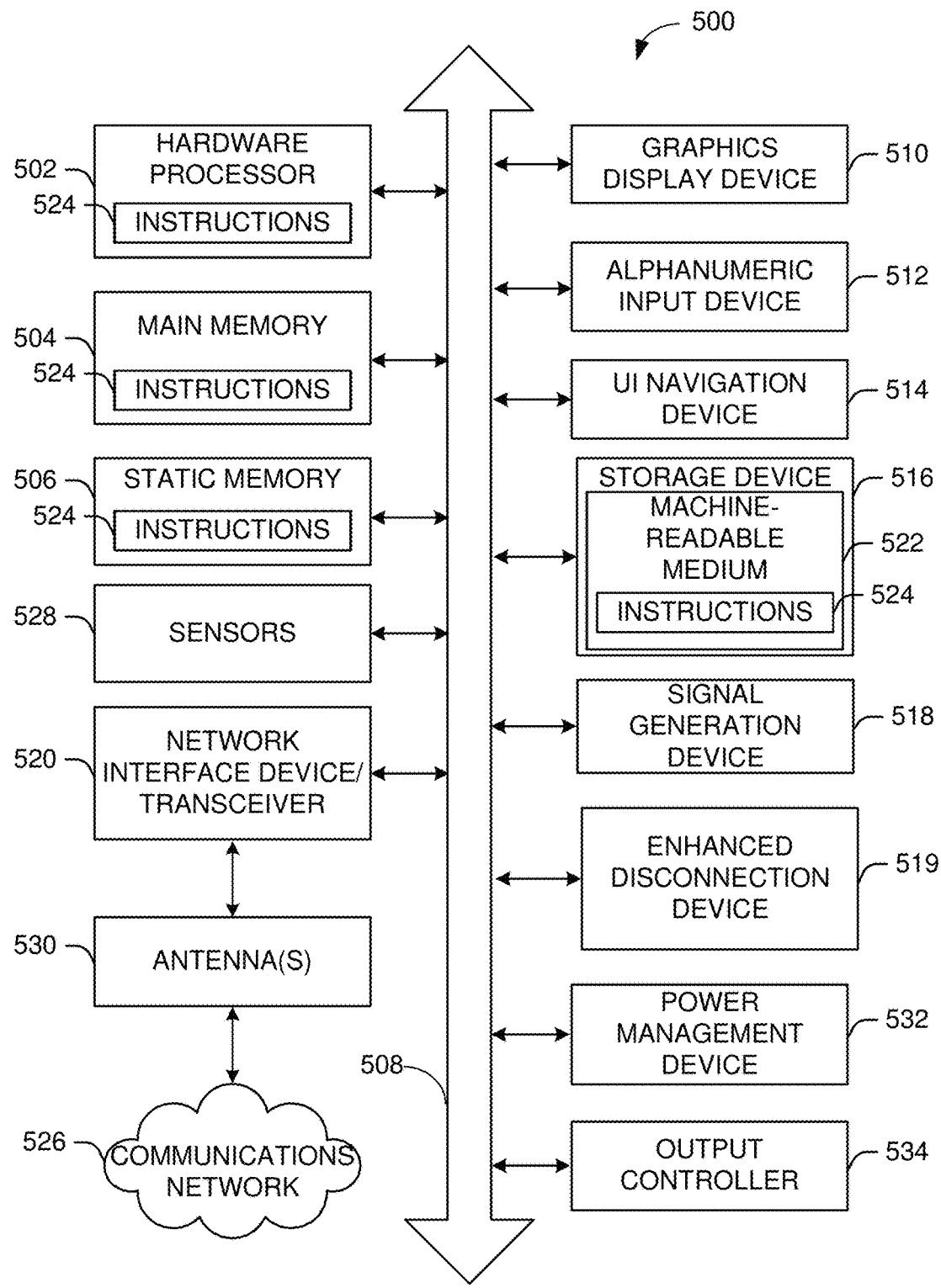
FIG. 5 depicts a block diagram of an example machine upon which any of one or more techniques (e.g., methods) may be performed, in accordance with one or more example embodiments of the present disclosure.

In some embodiments, the user device(s) 120 and AP 102 may include one or more computer systems similar to that of the functional diagram of FIG. 4 and/or the example machine/system of FIG. 5.

One or more illustrative user device(s) 120 and/or AP 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, for example, a DMG device, an EDMG device, a UE, an MD, a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128), and/or AP 102 may include any suitable radio and/or transceiver for transmitting and/or receiving radio frequency (RF) signals in the bandwidth and/or channels corresponding to the communications protocols utilized by any of the user device(s) 120 and/or AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11az). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The phrases "directional multi-gigabit (DMG)" and "directional band" (DBand), as used herein, may relate to a frequency band wherein the channel starting frequency is above 45 GHz. In one example, DMG communications may involve one or more directional links to communicate at a rate of multiple gigabits per second, for example, at least 1 Gigabit per second, 7 Gigabit per second, or any other rate.

In some demonstrative embodiments, user device(s) 120 and/or AP 102 may be configured to operate in accordance with one or more specifications, for example, including, one or more IEEE 802.11 specifications, e.g., an IEEE 802.11ax specification and/or any other specification and/or protocol.

Some specifications may be configured to support a single user (SU) system, in which an STA cannot transmit frames to more than a single STA at a time. Such specifications may not be able, for example, to support a STA transmitting to multiple STAs simultaneously, for example, using an MU-MIMO scheme, e.g., a downlink (DL) MU-MIMO, or any other MU scheme.

In some demonstrative embodiments, user device(s) 120 and/or AP 102 may be configured to implement one or more Multi-User (MU) mechanisms. For example, user device(s) 120 and/or AP 102 may be configured to implement one or more MU mechanisms, which may be configured to enable MU communication of Downlink (DL) frames using a MIMO scheme, for example, between a device, e.g., AP 102, and a plurality of user devices, e.g., including user device(s) 120 and/or one or more other devices.

In some demonstrative embodiments, and/or AP 102 may be configured to communicate over a Next Generation 60 GHz (NG60) network, an Extended DMG (EDMG) network, and/or any other network. For example, and/or AP 102 may be configured to communicate MIMO, e.g., DL MU-MIMO, transmissions and/or use channel bonding, for example, for communicating over the NG60 and/or EDMG networks.

In some demonstrative embodiments, and/or AP 102 may be configured to support one or more mechanisms and/or features, for example, channel bonding, single user (SU) MIMO, and/or and multi user (MU) MIMO, for example, in accordance with an EDMG Standard, an IEEE 802.11ax standard and/or any other standard and/or protocol.

In one or more embodiments, the user device(s) 120 may have a Wi-Fi radio 160 capable of sending and receiving Wi-Fi frames (e.g., as defined by the IEEE 802.11 family of standards), and may have a non-Wi-Fi radio 170 (e.g., Bluetooth, LTE, or another wireless technology) capable of sending and receiving non-Wi-Fi data. The Wi-Fi radio 160 may not identify or process data formatted for the non-Wi-Fi radio 170, and the non-Wi-Fi radio 170 may not identify or process data formatted for the Wi-Fi radio 160. The AP 102 and the user device(s) 120 may exchange frames 180, which may be Wi-Fi frames or non-Wi-Fi frames (e.g., Bluetooth, LTE, or another wireless technology).

Different wireless technologies may use communication links with communication interfaces designed for the specific type of communication (e.g., Wi-Fi interfaces for Wi-Fi communications, Bluetooth interfaces for Bluetooth communications). For example, Wi-Fi and Bluetooth communications use different radios and different hardware and software to support those radios. A message designed to be decoded and processed by a Wi-Fi radio may be different from a message designed to be decoded and processed by a Bluetooth radio, for example, so the messages designed for one communication method may not be properly recognized and decoded by hardware and software of a different communication method, and even if the messages are properly recognized and decoded, they may include information which causes no use of the radio of the other communication method, resulting in a waste of resources. Therefore, if the frames 180 are Wi-Fi frames, the non-Wi-Fi radio 170 may not properly recognize and decode the frames 180. If the frames 180 are non-Wi-Fi frames, the Wi-Fi radio 160 may not properly recognize and decode the frames 180.

In one or more embodiments, the frames 180 may be Wi-Fi beacons sent by the AP 102. If the Wi-Fi radio 160 consecutively does not receive the frames 180 at given times (e.g., based on a beacon interval), the Wi-Fi radio 160 may disconnect from the AP 102. Because the frames 180 may be non-Wi-Fi frames and may interfere with Wi-Fi beacons, however, the Wi-Fi radio 160 may not disconnect from the AP 102 after missing consecutive Wi-Fi beacons if the Wi-Fi radio 160 were aware of the operation of the non-Wi-Fi radio 170.

In one or more embodiments, the Wi-Fi radio 160 may rely on beacons (e.g., frames 180) transmitted by the AP 102 to determine Wi-Fi network conditions. When beacons are missed (e.g., not received at an expected time), the user device(s) 120 may determine that network conditions with the AP 102 are poor, may disconnect the Wi-Fi radio 160 from the AP 102, and may search for another AP to which to connect the Wi-Fi radio 160.

In one or more embodiments, the Wi-Fi radio 160 may operate in and transition between higher- and lower-powered states. The Wi-Fi radio 160 may operate in a low-power (e.g., power-save) mode at times to conserve power resources. For example, after receiving a beacon, the user device(s) 120 may determine a beacon interval indicating when a next beacon may be sent by the AP 102. During the interval, the user device(s) 120 may transition the Wi-Fi radio 160 to a low-power mode, and may wake up the Wi-Fi radio (e.g., transition to a higher-power mode) at the expected time of a next beacon. Failure to receive a beacon may result in the Wi-Fi radio 160 being in a higher-power mode when no beacon or other frame is being sent by the AP 102, or may result in the Wi-Fi radio 160 being in a low-power mode during which the Wi-Fi radio 160 may not receive beacons.

In one or more embodiments, the Wi-Fi radio 160 and the non-Wi-Fi radio 170 may be collocated at a respective device of the user device(s) 120 and may communicate with each other as explained further below.

Figure 2:
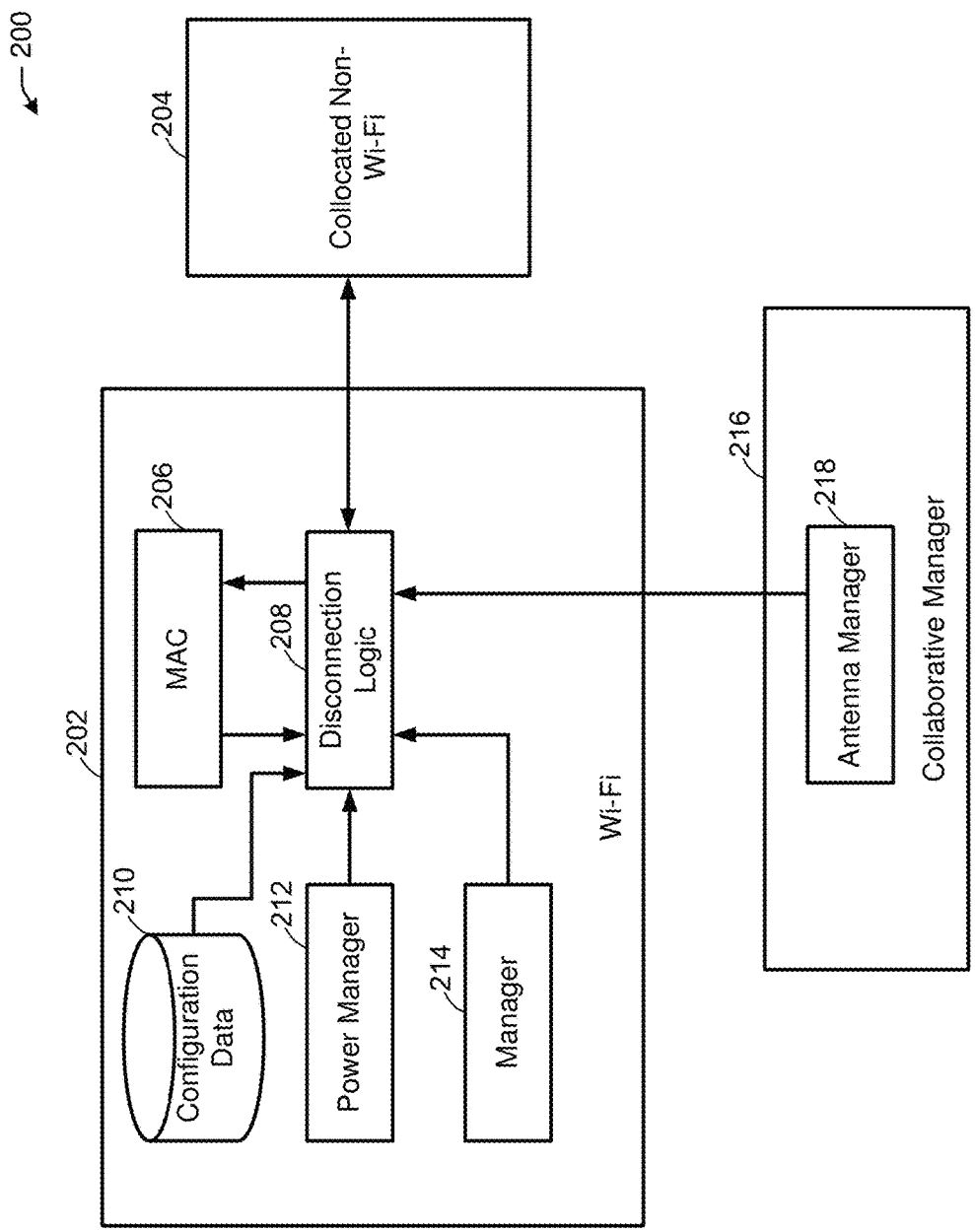
FIG. 2 depicts an illustrative interface for collocated wireless technology devices, in accordance with one or more example embodiments of the present disclosure.

FIG. 2 depicts an illustrative interface 200 for collocated wireless technology devices, in accordance with one or more example embodiments of the present disclosure.

Referring to FIG. 2, the interface 200 may be implemented on a STA (e.g., user device 120 of FIG. 1). The interface 200 may support a Wi-Fi radio 202 and a collocated non-Wi-Fi radio 204 (e.g., as shown by the Wi-Fi radio 160 and the non-Wi-Fi radio 170 of FIG. 1). The Wi-Fi radio 202 may include a MAC layer 206, disconnection logic 208, configuration data 210 (e.g., which may provide Wi-Fi configuration data to the disconnection logic 208), a power manager 212, and manager 214. A collaborative manager 216 may include an antenna manager 218, and may communicate with the Wi-Fi radio 202.

In one or more embodiments, the MAC layer 206 may determine if a frame (e.g., a beacon) was received by the Wi-Fi radio 202 or if any energy not identified as a beacon was detected at the Wi-Fi radio 202. The MAC layer 206 may indicate to the disconnection logic 208 that a frame such as a beacon was received. The manager 214 may determine a beacon interval based on an indication included in a received beacon (e.g., using a time synchronization factor indicated by the beacon to synchronize timing with an AP which sent a beacon). The power manager 212 may manage active and power save modes (e.g., higher- and lower-powered modes) for the Wi-Fi radio 202. For example, the power manager 212 may cause the Wi-Fi radio 202 to operate at a lower-powered mode in which the Wi-Fi radio 202 may not detect any transmissions, or may detect only transmissions from within a certain distance.

The power manager 212 may cause the Wi-Fi radio 202 to activate at a time based on a beacon interval when an associated AP is expected to send a beacon or other type of frame. The disconnection logic 208 may include a firmware model which may determine, based on the beacon interval or other timing data provided by the manager 214, when a beacon or other frame is expected to be received. The disconnection logic 208 may determine whether a beacon has been received based on whether the MAC layer 206 sends an indication that a beacon was received. If the disconnection logic 208 determines that the MAC layer 206 has not provided an indication of a received beacon for multiple consecutive beacon intervals (e.g., if a counter which increments to indicate consecutively missed beacons exceeds a threshold number of consecutively missed beacons), the disconnection logic 208 may determine that an existing AP connection is poor, and may send a disconnect request to the MAC layer 206. The MAC layer 206 may facilitate the establishment of a connection with another device (e.g., an AP or another STA), and may cause disconnection.

In one or more embodiments, the collaborative manager 216 may be a coexisting technology manager which manages multiple wireless communication technologies, such as Wi-Fi, Bluetooth, LTE, and other communication technologies. The collaborative manager 216 may include an antenna manager 218 which may measure an amount of isolation between respective antennas, for example. The antenna manager 218 may provide the antenna isolation information to the disconnection logic 208.

In one or more embodiments, the collocated non-Wi-Fi radio 204 may be a Bluetooth radio, and LTE radio, or another type of radio supporting a non-Wi-Fi wireless communication technology. The collocated non-Wi-Fi radio 204 may be implemented in a same chip (e.g., processing core) as the Wi-Fi radio 202 or on a different chip than the Wi-Fi radio 202. The collocated non-Wi-Fi radio 204 may provide a traffic indication to the Wi-Fi radio 202 indicating when the collocated non-Wi-Fi radio 204 has been active (e.g., transmitting and/or receiving) or when the collocated non-Wi-Fi radio 204 usually is active. The collocated non-Wi-Fi radio 204 may indicate traffic/activity in real-time or in non-real-time. In real-time, the collocated non-Wi-Fi radio 204 may report traffic characteristics of the wireless technology supported by the collocated non-Wi-Fi radio 204, such as a transmission or receiving direction, a transmission power of the collocated non-Wi-Fi radio 204, a relative received signal strength (RSSI), frequencies used by the collocated non-Wi-Fi radio 204, antennas used by the collocated non-Wi-Fi radio 204, and other information. In non-real-time, the collocated non-Wi-Fi radio 204 may provide transmission and/or reception periods of the collocated non-Wi-Fi radio 204, transmission and/or reception durations of the collocated non-Wi-Fi radio 204, transmission power of the collocated non-Wi-Fi radio 204, frequencies or frequency ranges used by the collocated non-Wi-Fi radio 204, antennas used by the collocated non-Wi-Fi radio 204, and other traffic information.

In one or more embodiments, the Wi-Fi radio 202 may maintain a counter indicating consecutively missed beacons. For example, when a beacon is expected based on a beacon interval, the disconnection logic 208 may determine whether a number of consecutively missed beacons (e.g., consecutive beacon intervals in which no beacon was detected by the Wi-Fi radio 202) exceeds a threshold number of consecutively missed beacons. When a beacon interval passes without the Wi-Fi radio 202 detecting a beacon, the disconnection logic 208 may allocate the counter by incrementing the counter. If the counter exceeds a threshold number of consecutively missed beacons, the disconnection logic 208 may send a disconnection request to the MAC layer 206, which may cause the Wi-Fi radio 202 to disconnect from a connected device. If the counter fails to exceed (e.g., is less than or equal to) the threshold number of consecutively missed beacons, the disconnection logic 208 may continue to wait for a subsequent beacon interval to determine if a beacon is received. When a beacon is received, the disconnection logic 208 may allocate the counter by resetting the counter to zero, or may keep the counter at its current number.

In one or more embodiments, using the traffic indications provided by the collocated non-Wi-Fi radio 204, the disconnection logic 208 may determine a connection status of the Wi-Fi radio 202. For example, the disconnection logic 208 whether a missed beacon may have been caused by activity of the collocated non-Wi-Fi radio 204. For example, the disconnection logic 208 may determine that the collocated non-Wi-Fi radio 204 was transmitting or receiving during a time overlapping a beacon interval when the Wi-Fi radio 202 expected to receive a beacon and did not. The disconnection logic 208 may determine based on which antennas were used by the collocated non-Wi-Fi radio 204 that a beacon may not have been received due to activity of the collocated non-Wi-Fi radio 204. The disconnection logic 208 may determine that the frequency used by the Wi-Fi radio 204 was used by the collocated non-Wi-Fi radio 204 at the time when the beacon was expected to be received, or that the frequency used by the Wi-Fi radio 204 was similar to (e.g., an adjacent frequency band, within a threshold frequency) of a frequency used by the collocated non-Wi-Fi radio 204 at the time when the beacon was expected to be received. The disconnection logic 208 may determine that an antenna used by the Wi-Fi radio 202 was the same as or similar to (e.g., an adjacent antenna, within a threshold number of antennas from the antenna used in a Wi-Fi communication) an antenna used by the collocated non-Wi-Fi radio 204 at the time when the beacon was expected to be received. Using non-real-time traffic indicators, the disconnection logic 208 may determine expected activities by the collocated non-Wi-Fi radio 204.

In one or more embodiments, when the disconnection logic 208 determines that the collocated non-Wi-Fi radio 204 may have been active when a beacon was supposed to be received but was not (e.g., a contaminated beacon was received or the beacon was missed), the disconnection logic 208 may adjust a determination of whether to disconnect the Wi-Fi radio 202 from an existing connection based on the traffic information and/or the antenna isolation as measured by the collaborative manager 216. Determining whether to disconnect the Wi-Fi radio 202 may include determining a connection status. For example, the disconnection logic 208 may consider a missed/contaminated beacon to be correctly received, and may refrain from (e.g., omit) incrementing the missed/contaminated beacon counter.

In one or more embodiments, the disconnection logic 208 may assign a different weight to a missed/contaminated beacon (e.g., may assign a higher weight representing the likelihood that the missed/contaminated beacon was caused by activity of the collocated non-Wi-Fi radio 204). When a beacon is missed/contaminated, the disconnection logic may assign a weight to the missed/contaminated beacon (e.g., 20%, indicating a 20% likelihood that the beacon was missed/contaminated because of the collocated non-Wi-Fi radio 204). If traffic information from the collocated non-Wi-Fi radio 204 indicates that the collocated non-Wi-Fi radio 204 was not active when a beacon was expected and was contaminated/missed, the disconnection logic 208 may assign a lower weight. If the weight of a contaminated/missed beacon exceeds a threshold, the counter may be incremented. If the weight of a contaminated/missed beacon fails to exceed a threshold, the contaminated/missed beacon may be considered received, resulting in the counter not incrementing or the threshold number of consecutively missed beacons being increased. The weight may be adjusted based on the traffic information. For example, the weight may be increased by the disconnection logic if the traffic information indicates a stronger signal used by the collocated non-Wi-Fi radio 204 when compared to a weaker signal, or when the traffic information indicates an adjacent antenna or frequency is used by the collocated non-Wi-Fi radio 204 (e.g., compared to an antenna or frequency further away from the antenna or frequency used by the Wi-Fi radio 202). For example, a strong signal strength in a transmission by the collocated non-Wi-Fi radio 204 may cause the disconnection logic 208 to increase the weight of a missed/contaminated beacon, but the weight may not exceed a threshold unless other conditions also are met, such as timing of the transmission (e.g., with respect to when the beacon was expected by the Wi-Fi radio), the antenna used by the collocated non-Wi-Fi radio 204, the frequency used by the collocated non-Wi-Fi radio 204, and other combinations of traffic information.

The disconnection logic 208 may adjust the consecutively missed/contaminated beacon threshold (e.g., by increasing the threshold to allow for more missed/contaminated beacons before determining to disconnect the Wi-Fi radio 202). The disconnection logic 208 may determine a duty cycle of the collocated non-Wi-Fi radio 204 (e.g., a percentage of a time period when the collocated non-Wi-Fi radio 204 is active) exceeds a threshold, and may send a request to the MAC layer 206 to disconnect the Wi-Fi radio 202. The disconnection logic 208 may determine whether a weighted beacon exceeds a weight threshold, may determine a counter based on whether the weighted beacon exceeds the weight threshold, may compare the counter to a missed beacon threshold, and may adjust the missed beacon threshold based on the likelihood that the missed beacon was caused by activity of the collocated non-Wi-Fi radio 204.

Figure 3:
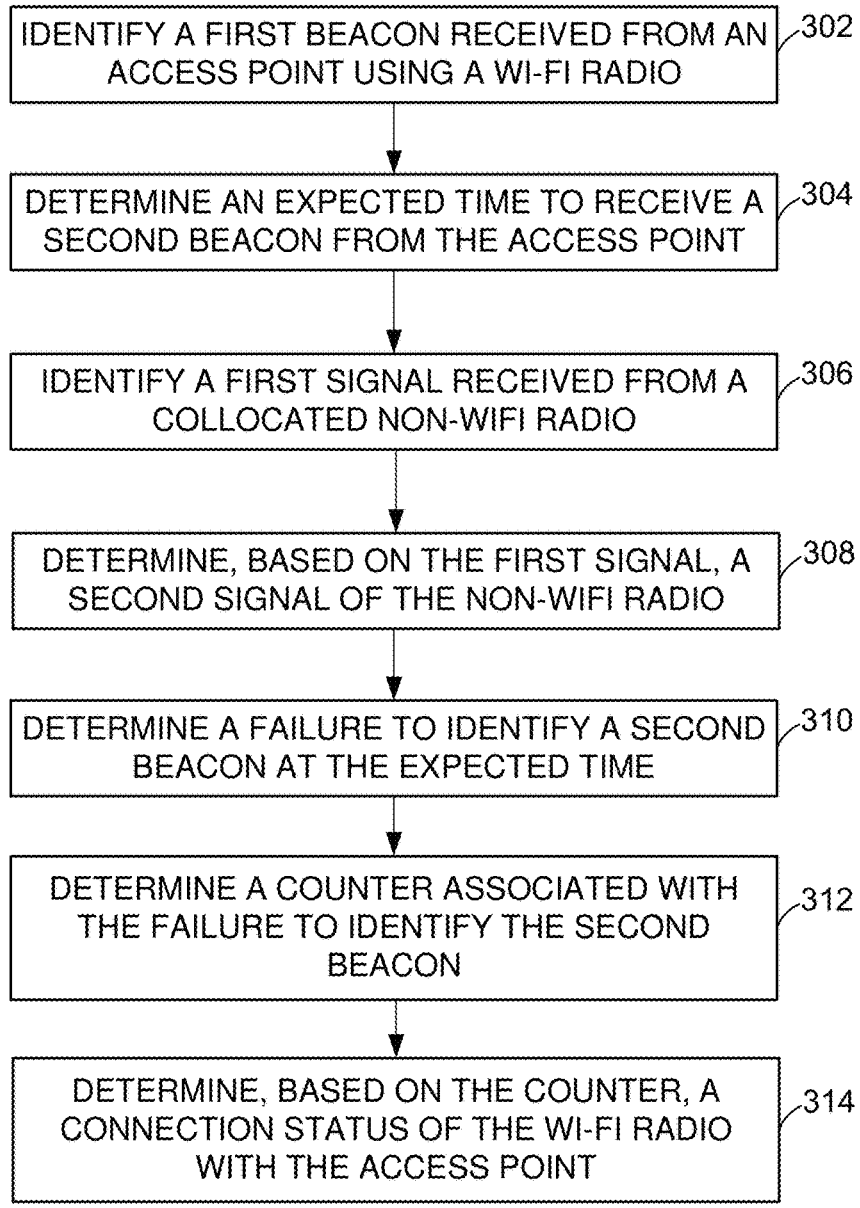
FIG. 3 depicts a flow diagram of illustrative process for disconnecting Wi-Fi radios due to operation of collocated wireless technology on a same device, in accordance with one or more embodiments of the disclosure.

FIG. 3A depicts a flow diagram of illustrative process 300 for disconnecting Wi-Fi radios due to operation of collocated wireless technology on a same device, in accordance with one or more example embodiments of the present disclosure.

At block 302, processing circuitry of a device (e.g., the user device(s) 120 of FIG. 1) may identify a first beacon received from an AP, wherein the first beacon may indicate a beacon interval, wherein the first beacon may be received using a first radio associated with Wi-Fi communications (e.g., the Wi-Fi radio 202 of FIG. 2). The AP may send beacons periodically according to a beacon interval which may represent a time between respective beacons. Any beacon may indicate a beacon interval so that a device which receives the beacon may determine the beacon interval and when to be awake (e.g., using a higher-powered mode) to receive the beacon. The beacon may include information about a network hosted by the AP and may be sent to any devices in a BSS.

At block 304, the processing circuitry may determine, based on the beacon interval, an expected time to receive a second beacon from the AP. The beacon may include a beacon interval, and the device may determine, based on the beacon interval, a time when the AP may send another beacon. The device may activate a low-power mode for a time until the next beacon is to be sent by the AP. A beacon may indicate when the device may ignore a subsequent beacon, so the device may remain in a low-power mode even when a beacon is sent by the AP, and may wake up to receive a beacon based on the beacon interval.

At block 306, the processing circuitry may identify a first signal received from a second radio, wherein the second radio is associated with non-Wi-Fi communications, wherein the first radio is collocated with the second radio (e.g., the non-Wi-Fi radio 170 of FIG. 1). The collocated second radio may indicate in real-time when the collocated second radio is operating, and may indicate a transmission or receiving direction, a transmission power, RSSI, a frequency used, any antenna used, and other information associated with operation of the collocated second radio. The collocated second radio may be Bluetooth, LTE, or another non-Wi-Fi technology radio. The collocated second radio may be on the same processing core or a different processing core than the first radio. The collocated second radio may indicate in non-real-time traffic information which the device may use to determine when the collocated second radio is likely to be operating. For example, the traffic information in non-real-time may indicate a transmission or reception time period, a transmission or reception duration, a transmission power, a frequency range, any antennas used, and other information associated with operation of the collocated second radio.

At block 308, the processing circuitry may determine, based on the first signal, an indication of a transmission or a reception of a second signal by the second radio during a time which overlaps the beacon interval. If the traffic information in the first signal is in real-time, the device may determine whether the collocated second radio was transmitting or receiving at a time overlapping when a beacon was expected, a transmission power used, a RSSI, a frequency used for transmission or reception, and antennas used for transmission or reception. If the traffic information is not in real-time, the device may determine expected transmission times and characteristics associated with the collocated second radio.

At block 310, the processing circuitry may determine a failure to identify a second beacon during the beacon interval (e.g., identify a contaminated/missed beacon). A failure to identify a beacon at an expected time, such as based on a beacon interval, may be an indicator that a collocated second radio was operating when the beacon was expected to be received. The device may assign a weight to missed/contaminated beacons indicative of a likelihood that a contaminated/missed beacon was caused by operation of the collocated second radio. When traffic information provided by the collocated second radio indicates that the collocated second radio was operating or was likely to be operating, and that the operation may have caused a beacon to not be received when expected (e.g., based on when the collocated second radio was operating, whether the frequency was within a frequency threshold used by the device, whether the antenna was within threshold number of antennas used by the device, whether the signal strength exceeds a threshold, and based on other traffic information), the device may consider a beacon to be contaminated/missed.

At block 312, the processing circuitry may determine a counter, wherein the counter may be associated with the failure to identify the second beacon during the beacon interval. The device may maintain a counter indicating a number of missed/contaminated beacons over a given period of time. The device may increment the counter when a beacon is determined to be missed/contaminated, or may maintain the counter and increase a threshold used to measure against the counter. The device may reset the counter when a beacon is received, or may maintain the counter at its current count until a time period or number of beacon intervals is reached.

At block 314, the processing circuitry may determine, based on the counter, a connection status of the first radio with the AP. The device may determine whether the counter exceeds a threshold count associated with a number of missed beacons. If the counter exceeds the threshold, the device may determine that too many beacons have been missed, and may disconnect from an AP. The counter may increment when a missed/contaminated beacon is identified, and a threshold count associated with a number of missed beacons may be increased to allow for missed/contaminated beacons when the collocated second radio was likely operating when a beacon was expected. If the counter is less than a threshold, the device may maintain the current Wi-Fi connection with the AP. If the device disconnects from the AP, the device may roam and search for another AP with which to connect, and may establish a connection with another AP.

It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or a user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The transceiver 410 may be a device comprising both a transmitter and a receiver that are combined and share common circuitry (e.g., communication circuitry 402). The communication circuitry 402 may include amplifiers, filters, mixers, analog to digital and/or digital to analog converters. The transceiver 410 may transmit and receive analog or digital signals. The transceiver 410 may allow reception of signals during transmission periods. This mode is known as full-duplex, and may require the transmitter and receiver to operate on different frequencies to minimize interference between the transmitted signal and the received signal. The transceiver 410 may operate in a half-duplex mode, where the transceiver 410 may transmit or receive signals in one direction at a time.

The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-5.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a data path structure for an enhanced disconnection device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the enhanced disconnection device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 904, within the static memory 506, or within the hardware processor 502 during execution thereof by the machine 500. In an example, one or any combination of the hardware processor 502, the main memory 904, the static memory 506, or the storage device 516 may constitute machine-readable media.

The data path structure for the enhanced disconnection device 519 may carry out or perform any of the operations and processes (e.g., process 300 of FIG. 3) described and shown above.

The enhanced disconnection device 519 may receive traffic information from a collocated radio of another (e.g., non-Wi-Fi) wireless technology. The collocated non-Wi-Fi radio may indicate to a Wi-Fi radio that the non-Wi-Fi radio is active (e.g., sending or receiving traffic). The Wi-Fi radio may determine that a missed beacon may be due to a "contamination" (e.g., interference) caused by the non-Wi-Fi radio's activity. The disconnection/roaming logic associated with the Wi-Fi radio may determine whether to disconnect from an AP based on the indication that the non-Wi-Fi radio is active. For example, the threshold amount of missed/contaminated beacons used to determine whether to disconnect from an AP may be adjusted based on the indicated activity of the non-Wi-Fi radio. In particular, the disconnection/roaming logic for the Wi-Fi radio may ignore a missed/contaminated beacon if the non-Wi-Fi radio was active when the beacon was expected, or may increase the threshold number of beacons to be missed/contaminated before disconnecting from an AP (e.g., if nine missed/contaminated beacons results in disconnection without non-Wi-Fi radio activity, the number of beacons which may cause disconnection may increase to ten or more beacons).

The enhanced disconnection device 519 may receive real-time in-chip signaling from the non-Wi-Fi radio indicating when the non-Wi-Fi radio is transmitting or receiving. The non-Wi-Fi radio may indicate when it has been active, and may indicate other information such as transmission/reception power, channel frequencies used, signal strength, and other relevant information that the Wi-Fi radio may use to determine whether a missed/contaminated beacon was caused by non-Wi-Fi radio activity.

The enhanced disconnection device 519 may receive non-real-time signaling from the non-Wi-Fi radio. For example, the non-Wi-Fi radio may indicate to the enhanced disconnection device 519 periodically its traffic patterns (e.g., when the non-Wi-Fi radio is transmitting/receiving). The enhanced disconnection device 519 may determine when missed/contaminated beacons may be caused by interference from the activity of the non-Wi-Fi radio based on the indications of when the non-Wi-Fi radio is expected to be active. If the enhanced disconnection device 519 and collocated non-Wi-Fi radio use different chips (e.g., processors or other hardware), an interface may be established between the Wi-Fi chip and the non-Wi-Fi chip to allow the collocated radios to indicate to each other when they are active or expected to be active. The enhanced disconnection device 519 may its logic may be implemented on a same chip as non-Wi-Fi radios and their respective logic.

The enhanced disconnection device 519 may receive activity indications provided by one or more non-Wi-Fi radios, which may result in an improvement of Wi-Fi coverage. In low-signal strength conditions, a Wi-Fi radio may expect to miss some beacons due to a poor connection. When a non-Wi-Fi radio is active on a same device, the non-Wi-Fi activity may increase the rate of missed/contaminated Wi-Fi beacons. The enhanced disconnection device 519 may determine, when a beacon is missed/contaminated, whether the number of consecutive missed beacons or beacons missed/contaminated over a given time has exceeded a threshold. When the non-Wi-Fi radio is active or is expected to be active based on periodic indicated activity, the threshold for missed beacons may increase to allow for more beacons to be missed/contaminated due to the increased likelihood of beacon misses caused by non-Wi-Fi radio activity.

The enhanced disconnection device 519 may indicate traffic characteristics to Wi-Fi logic, including transmission or reception direction, transmission power, signal strength, frequency, antennas used, and other information. The Wi-Fi logic may use the traffic characteristics to determine whether missed beacons may be caused by non-Wi-Fi activity. For example, the Wi-Fi logic may determine based on the traffic characteristics that a non-Wi-Fi signal sent or received by the device is strong and/or that the non-Wi-Fi radio may be communicating with a device nearby. Using the traffic characteristics, the Wi-Fi logic may determine that non-Wi-Fi communication characteristics are met or that any one or more of the traffic characteristics exceeds or fails to exceed a respective threshold (e.g., the strength of a non-Wi-Fi transmission at the time of a missed beacon exceeds a threshold strength). Considering the isolation of Wi-Fi antennas in addition to the traffic characteristics of the non-Wi-Fi radio, the Wi-Fi disconnection/roaming logic may determine whether a missed beacon is contaminated by the non-Wi-Fi activity of the same device.

In one or more embodiments, when a non-real-time interface between Wi-Fi and non-Wi-Fi cores/logic is used to indicate respective traffic, the collocated non-Wi-Fi logic may report traffic patterns to the enhanced disconnection device 519 (and vice versa). For example, the enhanced disconnection device 519 may report a transmission or reception period, a transmission or reception duration, transmission power, a frequency range, which non-Wi-Fi antennas may be used, and other relevant information. The enhanced disconnection device 519 may use this traffic information to determine traffic patterns of the non-Wi-Fi radio (e.g., when the non-Wi-Fi radio is expected to be active). The enhanced disconnection device 519 may not know for sure whether the non-Wi-Fi radio was active at a particular time, but may determine that the non-Wi-Fi radio was likely active at a particular time. When a non-Wi-Fi radio is indicated as or expected to be active when a Wi-Fi beacon is missed, or when the non-Wi-Fi traffic characteristics satisfy certain thresholds or criteria, the enhanced disconnection device 519 may tag a missed beacon as contaminated.

In one or more embodiments, using indications of non-Wi-Fi activity/traffic, the enhanced disconnection device 519 may modify disconnection/roaming logic. For example, the enhanced disconnection device 519 may consider any beacon identified as contaminated as received, or may modify the weight of the missed beacon. For example, a missed beacon may be weighted based on the likelihood that the missed beacon was caused by collocated non-Wi-Fi activity. When collocated non-Wi-Fi activity is indicated or anticipated when a contaminated beacon is received (e.g., a beacon is missed), the enhanced disconnection device 519 may assign a weight to the contaminated beacon that indicates a higher likelihood that the contaminated beacon was caused by non-Wi-Fi activity on the device. If the weight of the contaminated beacon exceeds a threshold (e.g., is sufficiently likely to be caused by non-Wi-Fi activity), the enhanced disconnection device 519 may consider the contaminated beacon as correctly received and may adjust a counter indicating a number of consecutively missed/contaminated beacons. The enhanced disconnection device 519 may adjust the threshold for consecutively missed beacons to allow for more missed beacons when non-Wi-Fi activity has occurred or was expected. When the non-Wi-Fi activity meets a condition (e.g., a duty cycle of the non-Wi-Fi communication is higher than a threshold), the enhanced disconnection device 519 may consider a contaminated beacon as received correctly or may adjust the threshold for missed beacons. If the counter exceeds a threshold, a Wi-Fi connection with an AP may be disconnected.

It is understood that the above are only a subset of what the data path structure for the enhanced disconnection device 519 may be configured to perform and that other functions included throughout this disclosure may also be performed by the enhanced disconnection device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: identify a first beacon received from an AP, wherein the first beacon indicates a beacon interval, wherein the first beacon is received using a first radio associated with Wi-Fi communications; determine, based on the beacon interval, an expected time to receive a second beacon from the AP; identify a first signal received from a second radio, wherein the second radio is associated with non-Wi-Fi communications, wherein the second radio is collocated with the first radio; determine, based on the first signal, an indication of a second signal by the second radio during a time which overlaps with the beacon interval; determine a failure to identify a second beacon during the beacon interval; determine a counter, wherein the counter is associated with the failure to identify the second beacon during the beacon interval; and determine, based on the counter, a connection status of the first radio with the AP.

Example 2 may include the device of example 1 and/or some other example herein, wherein the processing circuitry is further configured to: determine a threshold associated with a number of missed beacons; and increase the threshold based on the indication of the second signal, wherein to determine the counter comprises the processing circuitry being further configured to increment the counter, wherein to determine the connection status comprises the processing circuitry being further configured to: determine that the counter is less than the threshold; and maintain a connection with the AP.

Example 3 may include the device of example 1 and/or some other example herein, wherein the processing circuitry is further configured to determine a threshold associated with a number of missed beacons, wherein to determine the counter comprises the processing circuitry being further configured to increment the counter, wherein to determine the connection status comprises the processing circuitry being further configured to: determine that the counter exceeds the threshold; and cause to disconnect the first radio from the AP.

Example 4 may include the device of example 1 and/or some other example herein, wherein the processing circuitry is further configured to: determine, based on the indication, a weight associated with the failure; and determine that the weight exceeds a threshold, wherein to determine the counter comprises the processing circuitry being further configured to increment the counter, wherein to determine the connection status comprises the processing circuitry being further configured to: determine that the counter exceeds the threshold; and cause to disconnect the first radio from the AP.

Example 5 may include the device of example 1 and/or some other example herein, wherein the processing circuitry is further configured to: determine, based on the indication, a weight associated with the failure, wherein the weight represents a likelihood that the failure was caused by the second signal; and determine that the weight exceeds a threshold, wherein to determine the counter comprises the processing circuitry being further configured to maintain a current count of the counter, wherein to determine the connection status comprises the processing circuitry being further configured to: determine that the counter is less than the threshold; and maintain a connection with the AP.

Example 6 may include the device of example 1 and/or some other example herein, wherein the first signal indicates a transmission direction, a reception direction, or a transmission power, wherein to determine the counter is based on the transmission direction, the reception direction, or the transmission power.

Example 7 may include the device of example 1 and/or some other example herein, wherein the first signal indicates a first frequency associated with the second signal, wherein the processing circuitry is further configured to determine that the first frequency is within a threshold frequency of a second frequency used by the first radio, wherein to determine the counter comprises the processing circuitry being further configured to increment the counter based on the first frequency being within a threshold frequency of the second frequency.

Example 8 may include the device of example 7 and/or some other example herein, wherein the first signal indicates a first antenna associated with the second signal, wherein the processing circuitry is further configured to determine that the first antenna is within a threshold number of antennas from a second antenna used by the first radio, wherein to determine the counter comprises the processing circuitry being further configured to increment the counter based on the first antenna being within a threshold antenna of the second antenna.

Example 9 may include the device of example 1 and/or some other example herein, further comprising a transceiver configured to transmit and receive wireless signals.

Example 10 may include the device of example 9 and/or some other example herein, further comprising one or more antennas coupled to the transceiver.

Example 11 may include a non-transitory computer-readable medium storing computer-executable instructions which when executed by one or more processors result in performing operations comprising: identifying a first beacon received from an access point (AP), wherein the first beacon indicates a beacon interval, wherein the first beacon is received using a first radio associated with Wi-Fi communications; determining, based on the beacon interval, an expected time to receive a second beacon from the AP; identifying a first signal received from a second radio, wherein the second radio is associated with non-Wi-Fi communications, wherein the second radio is collocated with the first radio; determining, based on the first signal, an indication of a second signal by the second radio during a time which overlaps with the beacon interval; determining a failure to identify a second beacon during the beacon interval; determining a counter, wherein the counter is associated with the failure to identify the second beacon during the beacon interval; and determining, based on the counter, a connection status of the first radio with the AP.

Example 12 may include the non-transitory computer-readable medium of example 11 and/or some other example herein, the operations further comprising: determining a threshold associated with a number of missed beacons; and increasing the threshold based on the indication of the second signal, wherein determining the counter comprises incrementing the counter, wherein determining the connection status comprises: determining that the counter is less than the threshold; and maintaining a connection with the AP.

Example 13 may include the non-transitory computer-readable medium of example 11 and/or some other example herein, the operations further comprising determining a threshold associated with a number of missed beacons, wherein determining the counter comprises incrementing the counter, wherein determining the connection status comprises: determining that the counter exceeds the threshold; and causing to disconnect the first radio from the AP.

Example 14 may include the non-transitory computer-readable medium of example 11 and/or some other example herein, the operations further comprising: determining, based on the indication, a weight associated with the failure; and determining that the weight exceeds a threshold, wherein determining the counter comprises incrementing the counter, wherein determining the connection status comprises: determining that the counter exceeds the threshold; and causing to disconnect the first radio from the AP.

Example 15 may include the non-transitory computer-readable medium of example 11 and/or some other example herein, the operations further comprising: determining, based on the indication, a weight associated with the failure, wherein the weight represents a likelihood that the failure was caused by the second signal; and determining that the weight exceeds a threshold, wherein determining the counter comprises maintaining a current count of the counter, wherein determining the connection status comprises: determining that the counter is less than the threshold; and maintaining a connection with the AP.

Example 16 may include the non-transitory computer-readable medium of example 11 and/or some other example herein, wherein the first signal indicates a transmission direction or a reception direction or a transmission power, wherein determining the counter is based on the transmission direction, the reception direction, or the transmission power.

Example 17 may include the method of example 15 and/or some other example herein, wherein the first signal indicates a first frequency associated with the second signal, the operations further comprising determining that the first frequency is within a threshold frequency of a second frequency used by the first radio, wherein determining the counter comprises incrementing the counter based on the first frequency being within a threshold frequency of the second frequency.

Example 18 may include the method of example 15 and/or some other example herein, wherein the first signal indicates a first antenna associated with the second signal, the operations further comprising determining that the first antenna is within a threshold number of antennas from a second antenna used by the first radio, wherein determining the counter comprises incrementing the counter based on the first antenna being within a threshold antenna of the second antenna.

Example 19 may include a method comprising: identifying, by processing circuitry of a device, a first beacon received from an AP, wherein the first beacon indicates a beacon interval, wherein the first beacon is received using a first radio associated with Wi-Fi communications; determining, by the processing circuitry, based on the beacon interval, an expected time to receive a second beacon from the AP; identifying, by the processing circuitry, a first signal received from a second radio, wherein the second radio is associated with non-Wi-Fi communications, wherein the second radio is collocated with the first radio; determining, by the processing circuitry, based on the first signal, an indication of a second signal by the second radio during a time which overlaps with the beacon interval; determining, by the processing circuitry, a failure to identify a second beacon during the beacon interval; determining, by the processing circuitry, a counter, wherein the counter is associated with the failure to identify the second beacon during the beacon interval; and determining, by the processing circuitry, based on the counter, a connection status of the first radio with the AP.

Example, 20 may include the method of example 15 and/or some other example herein, further comprising: determining a threshold associated with a number of missed beacons; and increasing the threshold based on the indication, wherein determining the counter comprises incrementing the counter, wherein determining the connection status comprises: determining that the counter is less than the threshold; and maintaining a connection with the AP.

Example 21 may include an apparatus comprising means for: identifying a first beacon received from an AP, wherein the first beacon indicates a beacon interval, wherein the first beacon is received using a first radio associated with Wi-Fi communications; determining, based on the beacon interval, an expected time to receive a second beacon from the AP; identifying a first signal received from a second radio, wherein the second radio is associated with non-Wi-Fi communications, wherein the second radio is collocated with the first radio; determining, based on the first signal, an indication of a second signal by the second radio during a time which overlaps with the beacon interval; determining a failure to identify a second beacon during the beacon interval; determining, by the processing circuitry, a counter, wherein the counter is associated with the failure to identify the second beacon during the beacon interval; and determining, based on the counter, a connection status of the first radio with the AP.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising storage coupled to processing circuitry, the processing circuitry configured to:
    identify a first beacon received from an access point (AP), wherein the first beacon indicates a beacon interval, wherein the first beacon is received using a first radio associated with Wi-Fi communications;
    determine, based on the beacon interval, an expected time to receive a second beacon from the AP;
    identify a first signal received from a second radio, wherein the second radio is associated with non-Wi-Fi communications, wherein the second radio is collocated with the first radio;
    determine, based on the first signal, an indication of a second signal by the second radio during a time which overlaps with the beacon interval;
    determine a failure to identify a second beacon during the beacon interval;
    increment a counter, wherein the counter is associated with the failure to identify the second beacon during the beacon interval;
    determine a threshold associated with a number of missed beacons;
    increase the threshold based on the indication of the second signal;
    determine, based on the counter, a connection status of the first radio with the AP, wherein to determine the connection status comprises the processing circuitry being further configured to:
        determine that the counter is less than the threshold; and
        maintain a connection with the AP.

2. The device of claim 1, wherein to determine the connection status comprises the processing circuitry being further configured to
    cause to disconnect the first radio from the AP if the counter exceeds the threshold.

3. The device of claim 1, wherein the processing circuitry is further configured to:
    determine, based on the indication, a weight associated with the failure; and
    determine that the weight exceeds a threshold, wherein to determine the counter comprises the processing circuitry being further configured to increment the counter, wherein to determine the connection status comprises the processing circuitry being further configured to:
        determine that the counter exceeds the threshold; and
        cause to disconnect the first radio from the AP.

4. The device of claim 1, wherein the processing circuitry is further configured to:
    determine, based on the indication, a weight associated with the failure, wherein the weight represents a likelihood that the failure was caused by the second signal; and
    determine that the weight exceeds a threshold, wherein to determine the counter comprises the processing circuitry being further configured to maintain a current count of the counter, wherein to determine the connection status comprises the processing circuitry being further configured to:
        determine that the counter is less than the threshold; and
        maintain a connection with the AP.

5. The device of claim 1, wherein the first signal indicates a transmission direction associated with the second radio, a reception direction associated with the second radio, or a transmission power associated with the second radio, wherein to determine the counter is based on the transmission direction, the reception direction, or the transmission power.

6. The device of claim 1, wherein the first signal indicates a first frequency associated with the second signal, wherein the processing circuitry is further configured to determine that the first frequency is within a threshold frequency of a second frequency used by the first radio, wherein to determine the counter comprises the processing circuitry being further configured to increment the counter based on the first frequency being within a threshold frequency of the second frequency.

7. The device of claim 1, wherein the first signal indicates a first antenna associated with the second signal, wherein the processing circuitry is further configured to determine that the first antenna is within a threshold number of antennas from a second antenna used by the first radio, wherein to determine the counter comprises the processing circuitry being further configured to increment the counter based on the first antenna being within a threshold antenna of the second antenna.

8. The device of claim 1, further comprising a transceiver configured to transmit and receive wireless signals, wherein the transceiver is associated with the first radio, and wherein the wireless signals comprise the first beacon and the second beacon.

9. The device of claim 8, further comprising one or more antennas coupled to the transceiver.

10. A non-transitory computer-readable medium storing computer-executable instructions which when executed by one or more processors result in performing operations comprising:
    identifying a first beacon received from an access point (AP), wherein the first beacon indicates a beacon interval, wherein the first beacon is received using a first radio associated with Wi-Fi communications;
    determining, based on the beacon interval, an expected time to receive a second beacon from the AP;
    identifying a first signal received from a second radio, wherein the second radio is associated with non-Wi-Fi communications, wherein the second radio is collocated with the first radio;
    determining, based on the first signal, an indication of a second signal by the second radio during a time which overlaps with the beacon interval;
    determining a failure to identify a second beacon during the beacon interval;

incrementing a counter, wherein the counter is associated with the failure to identify the second beacon during the beacon interval;

determining a threshold associated with a number of missed beacons; and increasing the threshold based on the indication of the second signal determining, based on the counter, a connection status of the first radio with the AP, wherein determining the connection status comprises:

determining that the counter is less than the threshold; and maintaining a connection with the AP.

11. The non-transitory computer-readable medium of claim 10, wherein determining the connection status comprises causing to disconnect the first radio from the AP if the counter exceeds the threshold.

12. The non-transitory computer-readable medium of claim 10, the operations further comprising:

determining, based on the indication, a weight associated with the failure; and determining that the weight exceeds a threshold, wherein determining the counter comprises incrementing the counter, wherein determining the connection status comprises:

determining that the counter exceeds the threshold; and causing to disconnect the first radio from the AP.

13. The non-transitory computer-readable medium of claim 10, the operations further comprising:

determining, based on the indication, a weight associated with the failure, wherein the weight represents a likelihood that the failure was caused by the second signal; and determining that the weight exceeds a threshold, wherein determining the counter comprises maintaining a current count of the counter, wherein determining the connection status comprises:

determining that the counter is less than the threshold; and maintaining a connection with the AP.

14. The non-transitory computer-readable medium of claim 10, wherein the first signal indicates a transmission direction or a reception direction or a transmission power, wherein determining the counter is based on the transmission direction, the reception direction, or the transmission power.

15. The non-transitory computer-readable medium of claim 10, wherein the first signal indicates a first frequency associated with the second signal, the operations further comprising determining that the first frequency is within a threshold frequency of a second frequency used by the first radio, wherein determining the counter comprises incrementing the counter based on the first frequency being within a threshold frequency of the second frequency.

16. The non-transitory computer-readable medium of claim 10, wherein the first signal indicates a first antenna associated with the second signal, the operations further comprising determining that the first antenna is within a threshold number of antennas from a second antenna used by the first radio, wherein determining the counter comprises incrementing the counter based on the first antenna being within a threshold antenna of the second antenna.

17. A method, comprising:

identifying, by processing circuitry of a device, a first beacon received from an access point (AP), wherein the first beacon indicates a beacon interval, wherein the first beacon is received using a first radio associated with Wi-Fi communications;

determining, by the processing circuitry, based on the beacon interval, an expected time to receive a second beacon from the AP;

identifying, by the processing circuitry, a first signal received from a second radio, wherein the second radio is associated with non-Wi-Fi communications, wherein the second radio is collocated with the first radio;

determining, by the processing circuitry, based on the first signal, an indication of a second signal by the second radio during a time which overlaps with the beacon interval;

determining, by the processing circuitry, a failure to identify a second beacon during the beacon interval;

incrementing, by the processing circuitry, a counter, wherein the counter is associated with the failure to identify the second beacon during the beacon interval;

determining a threshold associated with a number of missed beacons;

increasing the threshold based on the indication;

determining, by the processing circuitry, based on the counter, a connection status of the first radio with the AP, wherein determining the connection status comprises:

determining that the counter is less than the threshold; and maintaining a connection with the AP.

* * * * *